Oct. 31, 1944. J. G. ALLEN 2,361,584
CATALYTIC CONVERSION OF HYDROCARBONS
Filed May 24, 1943
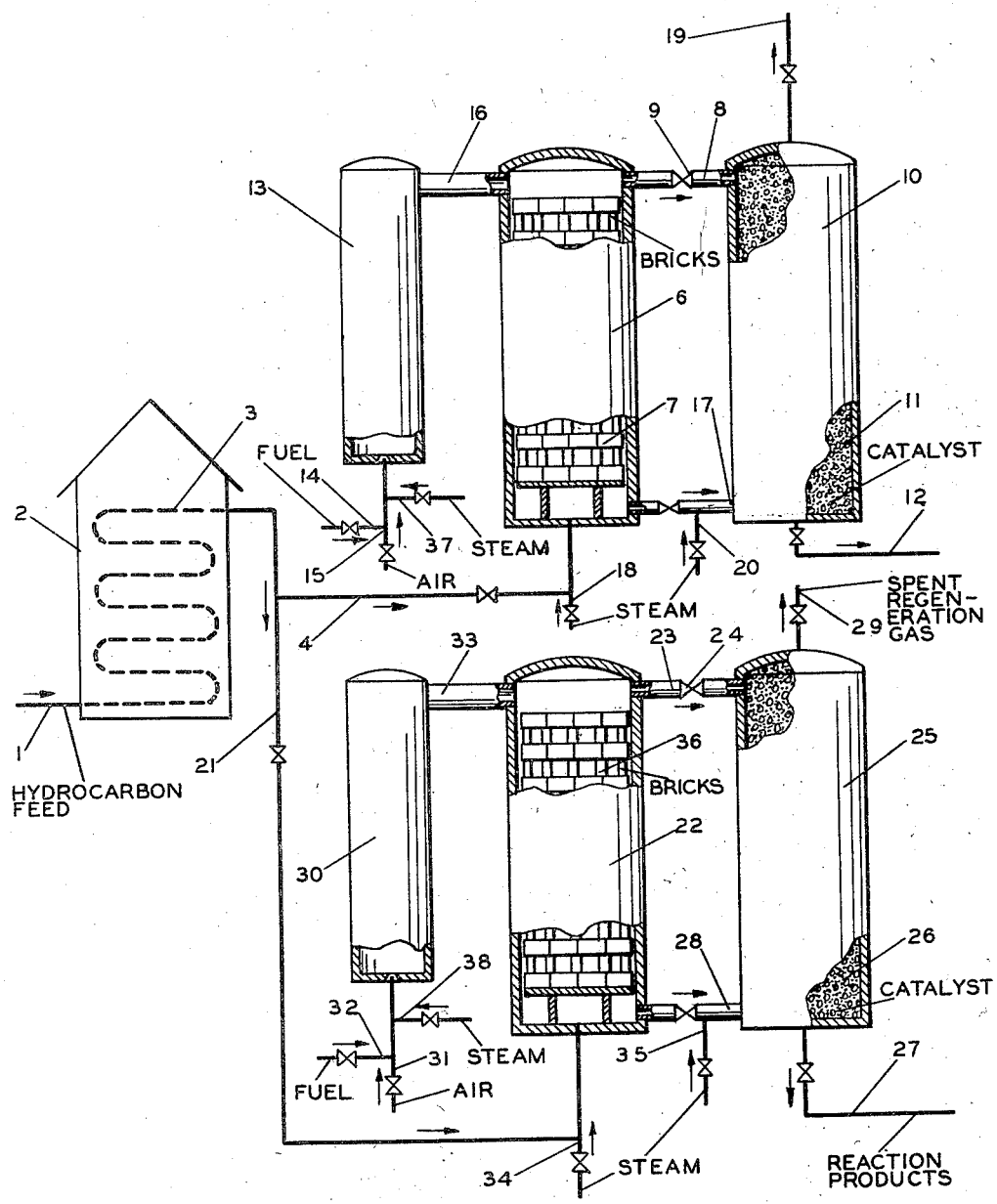
INVENTOR
J.G. ALLEN
BY
ATTORNEYS Patented Oct. 31, 1944

2,361,584

UNITED STATES PATENT OFFICE 2,361,584

CATALYTIC CONVERSION OF HYDROCARBONS

John Gordon Allen, Forest Hills, N. Y., assignor to Phillips Petroleum Company, a corporation of Delaware Application May 24, 1943, Serial No. 488,216

5 Claims. (Cl. 196—52)

The present invention relates to a method and apparatus for carrying out catalytic conversion of hydrocarbons, particularly of the type in which catalyst is deactivated by deposition of carbonaceous material thereon. In processes of this type, a plurality of reactors is provided, in one of which active catalyst is contacted with hydrocarbon reactants at conversion temperatures until the catalyst is substantially deactivated, while in another, deactivated catalyst is regenerated by burning off the carbonaceous deposits with an oxygen-containing gas at combustion temperatures. Where stationary catalyst beds are utilized, flow of hydrocarbon feed and of regenerating gas alternates between fresh and deactivated catalyst beds respectively, while where moving beds are utilized, feed flows through one zone through which catalyst is flowing, the deactivated catalyst flowing through another zone into which oxygen-containing gas is introduced.

In accordance with present practice, the hydrocarbon feed is preheated to or near reaction temperatures in a furnace or other heater, supplemental heating means being provided in the conversion zone if necessary. Regeneration gas is formed by burning air with fuel to produce an oxygen-containing flue gas having a desired low oxygen content, and this flue gas is contacted with deactivated catalyst at combustion temperatures. In operations of this type a considerable amount of heat is required to preheat feed to reaction temperatures, while at the same time a substantial heat loss occurs in the combustion of fuel to make the low-oxygen-content regeneration gas.

It is an object of the present invention to provide a method and apparatus for performing hydrocarbon conversion reactions in which the reactants are preheated utilizing heat produced in formation of regenerating gases. It is a further object to provide a method and apparatus for preheating feed to a reaction zone in which direct heat exchange is utilized. It is another object of the present invention to catalytically crack hydrocarbons while preheating the feed by direct heat exchange with hot refractory bodies, said bodies having been previously heated by direct heat exchange with products of combustion to be utilized for regenerating deactivated catalyst. Other objects will be apparent in the light of the specification and claims herein described.

The practice of the present invention may be illustrated by describing the operation of a fixed bed catalytic cracking operation. A pair of cracking chambers is provided, each filled with cracking catalyst, such as bauxite, "Super Filtrol," synthetic silica-alumina, etc. Connected to each cracking chamber is a regenerative type heater or furnace, said furnace containing checkerwork or other arrangement of refractory brick or other suitable heat retaining material having high heat retentive capacity and able to withstand elevated temperatures. Alundum, carborundum, fireclay, or the like, are suitable refractory materials as is known to the art. Because of its relatively high thermal conductivity and heat retaining capacity, as well as its physical strength, carborundum is an especially desirable material. In beginning the operation of the instant process a hydrocarbon feed to be catalytically cracked, such as gas oil, is preheated to conversion temperatures, in the range of 850–1150° F., and then passed through the first catalytic cracking zone containing active catalyst for a period of time sufficient to produce substantial deactivation of catalyst by deposition of carbon and/or other carbonaceous matter thereon.

At this point the feed is switched to the second catalyst zone. While the cracking reaction is going on, the deactivated catalyst is regenerated in the manner described below. A mixture of gaseous hydrocarbon or other fuel and air is introduced into the combustion zone of the regenerative furnace connected to the first catalyst chamber, and is burned to produce a hot flue gas containing an excess of oxygen—say, from 2 to 10%. The hot flue gas, which is at a temperature of say 1500–2000° F. or more, contacts refractory brick arranged as checkerwork or in other suitable manner in the regenerative furnace, heating same to a temperature substantially above the catalytic cracking range while at the same time the flue gas temperature leaving the regenerative furnace is lowered somewhat. At this point the hot oxygen-containing gas is introduced into the first catalyst chamber containing deactivated catalyst whereby the carbon deposit is burned off. Conversion of hydrocarbons takes place simultaneously in the second catalyst zone.

As the conclusion of the conversion cycle, the system is reversed, the first catalyst chamber being now again on conversion cycle while the second is regenerated. The feed to the first chamber is now preheated to reaction temperatures by being contacted in vapor or liquid phase with the hot checkerbrick in the regenerative furnace, flowing therefrom into the conversion zone. In this way heat of combustion formed during the preparation of the regenerating gas is efficiently utilized in direct heat exchange with the feed.

When the reactivation of the second catalyst is completed, the system is again reversed and the feed conducted to said chamber through the hot checkerbrick in the second regenerative furnace.

Since it is frequently desirable to purge the catalyst chambers before and after regeneration, this may be accomplished by introducing superheated steam or hot oxygen-free flue gas through the regenerative furnace and through the catalyst bed to purge both zones of residual oxygen-containing gases from regeneration, on the one hand, or residual hydrocarbons from the reaction, on the other.

The process and apparatus may be described in greater detail by reference to the accompanying drawing which shows one preferred embodiment of my invention. The apparatus is shown partially in cross-section and partially in cutaway view. Numeral 1 designates a conduit conducting fluid to be converted through preheating coil 3 in heater 2. The temperature to which the fluid is preheated may be varied at will. Ordinarily it will be preferred to heat the hydrocarbon to vaporizing temperature so that it may be introduced into the subsequent heating zone in vapor phase. If desired the hydrocarbon may be only partially vaporized and introduced into the subsequent preheater in mixed phase. In some cases it may be desirable to by-pass heater 2 by means not shown and introduce liquid hydrocarbon directly into the regenerative preheater. This will depend on the rate of flow and the amount of heat which must be abstracted from the regenerative heater as will now fully hereinafter appear.

After leaving preheating coil 3 the vaporized hydrocarbon is introduced via line 4 into regenerative preheater 6 at a flow rate and for a period of time sufficient to raise the temperature of the hydrocarbon to the desired conversion range by absorption of heat from refractory bricks 7 which have been heated in a previous regeneration cycle to substantially higher temperatures. The thus preheated hydrocarbon is withdrawn from heating chamber 6 via line 8 and valve 9 at or slightly above conversion temperatures and flows through active catalyst bed 11 in reaction zone 10, the reaction products then leaving through line 12 and being conducted to conventional recovery apparatus not shown for separation of desired products. Where it is desired to admix steam with the feed as a diluent in the reaction, this may be done via line 13.

At the same time, a heating and regeneration cycle is being carried out in other portions of the apparatus. Air and fuel are introduced into the combustion zone 30 of regenerative furnace 22 via lines 31 and 32 respectively. Steam may be introduced into the combustion zones 13 and 30 along with air and fuel to control temperatures therein, through lines 37 and 38 respectively. Within the zone combustion takes place with a controlled excess of oxygen to produce a hot oxygen-containing flue gas containing the proportion of oxygen desired for regeneration. Ordinarily from 2 to 10% of $O_2$ is desirable. This gas, at a temperature in the range of about 1,500–3,000° F., depending on combustion conditions, is conducted into the portion of the furnace containing the contact material through conduit 39, flowing downwardly through refractory material 36. The refractory may be in the form of brick arranged in conventional checkerwork fashion as illustrated or other suitable arrangement providing satisfactory heat transfer. The brick may be of any suitable heat absorbent material. Where relatively short cycles are to be used it is desirable to select a contact material having high specific heat as well as high thermal conductivity in order to obtain sufficiently rapid heat transfer without the necessity of using unduly large amounts of refractory and the consequent necessity for using extremely large furnaces. Such a material is carborundum, which may be used in the form of conventional bricks, or longitudinal "splits" thereof. The combustion of air and fuel may take place in a separate zone attached to the regenerative zone as shown, or may be carried out partially or completely within the regenerative preheater itself.

The hot oxygen-containing gas imparts a substantial portion of its sensible heat to heat absorbent material 36 and at the same time its temperature is reduced substantially. By a proper choice of volume and flow rate of this gas, the refractory may be sufficiently heated while at the same time the effluent gas may be at a temperature within the range desired for regeneration. In the event it is not desirable to so correlate conditions, the temperature of the oxygen-containing gas leaving unit 22 may be further reduced by the injection of a sufficient amount of steam at a lower temperature through line 35. The regeneration gas, at a temperature in the range of about 700–1200° F. flows via line 23 into reaction zone 25 containing catalyst 26 deactivated from a previous conversion. The carbon deposit is burned by contact with the oxygen in the regeneration gas and the products of combustion are withdrawn from the chamber through line 29. When regeneration is complete, purging of the heat absorbent material and of the catalyst to remove absorbed or adsorbed oxygen or oxygenated compounds may be effected by introducing superheated steam through line 33 or line 34 after discontinuing flow of regeneration gas. A short purge with steam will not substantially reduce the refractory temperature, but will temporarily cool the surface before oil contacts it and will thereby have an added advantage in preventing excessive non-catalytic cracking of the oil in the preheat chamber immediately at the start of the cracking part of the cycle.

After purging is completed, the hydrocarbon feed is then introduced via line 21 into preheating furnace 22 where it absorbs heat from bricks 36 and then flows via line 23 and valve 24 into conversion zone 25 and downwardly through reactivated catalyst bed 26. Reaction products are removed through line 27 and conducted to the recovery system. Simultaneously the catalyst in chamber 10 is being regenerated and the refractory in 6 being re-heated for another cycle. After a short purge with steam, fuel and air are introduced into combustion zone 13 of the regenerative furnace 6 by means of lines 14 and 15 respectively. Combustion of fuel takes place and the regeneration gas is formed by providing for the desired excess of air. The hot combustion-regeneration gas is conducted into chamber 6 via conduit 16 and flows downwardly through the brickwork 7 imparting its heat thereto. The cooled regeneration gas, at or near regeneration temperatures, leaves via line 17, steam being added for cooling purposes if desired via line 28. The regeneration gas burns the carbon from the deactivated catalyst 11 and is removed via line 19. Immediately prior to beginning the flow of regeneration gas, purging of hydrocarbons from the furnaces and the conversion zones may be effected by introducing steam through lines 18 or 34 as the case may be.

The volume and spacing of refractory material in the regenerative furnaces will depend on the rate and amount of heat transfer to be effected. These factors depend on the nature of the refractory material itself, its thermal properties, on the temperature rise to be obtained on preheating, the rate of flow and character of hydrocarbons to be treated, on the heat produced in preparing regeneration gas, etc. The variables referred to may be readily determined in each case, knowing the specific heat, density, and conductivity of the refractory, the nature and quantity of feed and the extent of temperature rise which must be effected during the cycle and the volume and oxygen content required in the flue gas to burn off the carbon on the deactivated catalyst.

The principles described herein are applicable to any type of hydrocarbon conversion reaction which is carried out at elevated temperature and requires preheating of feed. They are particularly applicable to catalytic reactions in which catalyst is deactivated by deposition of carbon thereon and is reactivated by contact with oxygen-containing gases at combustion temperatures in order to burn the carbon off. Typical reactions of this type include cracking, dehydrogenation, aromatization, reforming, desulfurization, etc. Where hot oxygen-containing gases are not required for regeneration, the combustion of fuel and contact of the hot products of combustion with refractory material in a regenerative furnace in one cycle, and contact of feed with said hot refractory material in another cycle for preheating, will still provide an efficient mode of heating the hydrocarbon.

Cracking reactions may be carried out on normally liquid hydrocarbon feed stocks at temperatures ranging from 750–1200° F. and pressures ranging from atmospheric to 100 pounds per square inch, using conventional cracking catalysts such as bauxite, silica-alumina, natural and synthetic clays, acid treated bentonite, "Super-Filtrol" and the like. For dehydrogenation, particularly of normally gaseous hydrocarbons, catalysts such as chromic oxide, alumina, and/or magnesia, promoted or modified by alkali metal oxides, alkaline earth metal oxides, or other such well known catalyst may be used.

The process may be illustrated by the following example:

An apparatus as described above is designed to catalytically crack 100 barrels a day of 35° A. P. I. gas oil. Each regenerative furnace contains 600 carborundum "splits" 1¼" x 4½" x 9" arranged as a stack of bricks 15 feet high, which corresponds to 20 layers, each containing 30 bricks. The bricks are arranged vertically with their wide longitudinal faces parallel to each other and defining continuous vertical channels about one inch in width. Each brick has a heat storage capacity of about 1.15 B. t. u./°F. The conversion zones each contains 9.5 cubic feet of synthetic silica-alumina cracking catalyst.

The conversion and regeneration cycles are operated for ten minutes each before reversal, with one minute taken from each end of the regeneration cycle for purging.

Gas oil feed is vaporized to about 700° F. and introduced into one of the regenerative preheaters which has been brought up to temperature in a previous regeneration cycle, at the rate of 175 gallons per hour, which corresponds to a space velocity of about 2.5 volumes of cold oil/hour/volume of catalyst in the conversion zone. At the entrance to the regenerative preheater, steam is introduced into the hydrocarbon vapor as a diluent for the cracking reaction in the ratio of 3 mols of steam/mol of oil, corresponding to 306 lb./hr. of steam. The steam is at a temperature of about 300° F., the combined oil-steam feed to the preheater entering at about 500° F. In the regenerative preheater, the hydrocarbon-steam mixture absorbs heat from the bricks and leaves the preheater at a temperature of about 1150° F., after which it enters the cracking chamber. A total effluent is withdrawn therefrom which on fractionation yields hydrocarbons of motor fuel range amounting to 60 volume per cent of the charge. This reaction corresponds to a conversion of 50% of the raw charge into products of a different boiling range. About 1.5 weight per cent of the raw charge is converted to carbon which is deposited on the catalyst.

The other preheater is concurrently brought to temperature by burning a refinery gas having a net heating value of about 1525 B. t. u./cubic foot in the combustion zone of the regenerative preheater. In order to avoid generation of excess heat in the combustion to enable the oxygen-containing flue gas to be at a suitable temperature for immediate use as a regenerating gas, steam is introduced along with the fuel gas and air. These are introduced at the rate of 685 cubic feet/hour of fuel, 226 cubic feet/minute of air and 715 lb./hour of steam at 300° F. The resultant flue gas contains about 2% oxygen and enters the checkerwork at a temperature of about 1800° F., leaving at a temperature of about 925° F. At this latter temperature, it is introduced into the deactivated catalyst zone whereby the carbon on the catalyst is burnt off. Purging is effected by flowing steam through the apparatus for about one minute before beginning the flow of fuel and air into the combustion zone, and after the regeneration has proceeded for about eight minutes, shutting off the flow of fuel and air and continuing flow of steam for another minute. At this point, the flow of hydrocarbon feed is switched to the second regenerative preheater for the second conversion cycle under the same conditions as the first, while regeneration and heating of the preheater is carried out in the same manner as in the previous regeneration cycle described above.

In place of carborundum as the refractory contact material in the above example, alundum or other refractory brick may be used, particularly if a substantially larger volume and surface of brick is utilized to compensate for the lower conductivity of these materials. Comparing thermal conductivities, carborundum has a conductivity of about 106 B. t. u./hr./sq. ft./degree F./inch while alumina has a conductivity of only 17 and fire clay a conductivity of 8. On the other hand, the differences between these materials in specific heats and densities is not as great. By the use of larger volumes of these less conductive materials, arranged in a manner to expose a larger surface to the gases to be heated, substitution may be made in a manner known to those skilled in the art.

I claim:

1. In a process for catalytic conversion of hydrocarbons in which the catalyst is periodically regenerated by combustion of carbon deposited thereon during conversion, the steps which comprise preheating hydrocarbon feed to conversion temperatures by contacting same with hot contact material in a preheating zone, flowing said heated feed through a catalyst zone wherein conversion takes place, interrupting flow of feed after a desired time interval, burning a combustible mixture in the presence of said contact material in said preheating zone to reheat same, and flowing the hot flue gas produced thereby admixed with oxygen into said catalyst zone to regenerate said catalyst.

2. A process according to claim 1 in which a plurality of catalyst zones and preheating zones are utilized and in which one catalyst zone and one preheating zone are on reaction cycle while another is on regeneration cycle.

3. In a process for the catalytic conversion of hydrocarbons in which catalyst is deactivated by deposition of carbon thereon and periodically regenerated by contact with an oxygen-containing gas for combustion of the carbon, the steps which comprise generating regeneration gas by combustion of fuel in a combustion zone, contacting products of combustion with a body of solid heat absorbent material to absorb heat of combustion from said products of combustion, contacting said products of combustion together with a predetermined proportion of oxygen with said deactivated catalyst to burn off the carbon, and preheating hydrocarbon feed for the catalytic conversion reaction by contacting same with the heat absorbent material containing said absorbed heat of combustion.

4. A process according to claim 3 in which said heat absorbent material containing said absorbed heat of combustion is purged, prior to contact with said hydrocarbon feed, with a limited quantity of relatively cooler steam for a time sufficient to remove oxygen therefrom and to cool the surface of said material sufficiently to minimize non-catalytic cracking of hydrocarbon feed subsequently contacted therewith, but insufficient to substantially reduce the average temperature of said material.

5. A process for the catalytic conversion of hydrocarbons which comprises preheating said hydrocarbons to conversion temperature by contact with a body of refractory material heated to a temperature substantially higher than that of said hydrocarbon feed, the quantity of said refractory material and the contact time of said hydrocarbon being selected to absorb a predetermined quantity of heat from said refractory material, contacting said preheated hydrocarbon with a body of conversion catalyst to effect the conversion reaction until substantial deactivation of said catalyst by deposition of carbon thereon occurs, burning a mixture of air and fuel to produce a hot flue gas containing a predetermined amount of oxygen, contacting said flue gas with said refractory material to absorb heat from said flue gas and lower the temperature thereof, contacting the thus-cooled oxygen-containing flue gas with said deactivated catalyst at regeneration temperatures to burn the carbon therefrom and regenerate said catalyst, and utilizing the refractory material containing heat absorbed from said flue gas for preheating hydrocarbon feed to the reaction.

JOHN GORDON ALLEN.